United States Patent [19]

Ohuchi

[11] 4,025,858
[45] May 24, 1977

[54] LOCATING APPARATUS

[76] Inventor: Nobutoshi Ohuchi, Hojyo, Japan

[22] Filed: Jan. 15, 1975

[21] Appl. No.: 541,256

[30] Foreign Application Priority Data

Jan. 16, 1974 Japan .................. 49-8025

[52] U.S. Cl. ............................................. 318/673
[51] Int. Cl.² ........................................ G05B 11/14
[58] Field of Search .................. 318/673, 601, 602

[56] References Cited
UNITED STATES PATENTS

| | | | |
|---|---|---|---|
| 3,256,473 | 6/1966 | Simopoulos et al. | 318/602 |
| 3,360,702 | 12/1967 | Lasley et al. | 318/673 |
| 3,378,742 | 4/1968 | Telkamp | 318/673 |
| 3,456,173 | 7/1969 | Funfstuck | 318/673 |
| 3,590,355 | 7/1971 | Davis | 318/602 |
| 3,614,574 | 10/1971 | Hodges | 318/673 |
| 3,689,820 | 9/1972 | Takegawa | 318/602 |
| 3,795,852 | 3/1974 | Favard | 318/602 |
| 3,843,915 | 10/1974 | Helmbold | 318/602 |
| 3,860,859 | 1/1975 | Buckley | 318/673 |
| 3,912,996 | 10/1975 | Yanagawa | 318/673 |

Primary Examiner—James R. Scott
Attorney, Agent, or Firm—George J. Neilan

[57] ABSTRACT

A locating apparatus comprising a search position-selecting device for selecting a desired search position; a starting unit; a selected search position-locating unit for finding a search position selected by the search position-selecting device and generating a signal for deciding the direction in which a locating mechanism-driving device is actuated in response to the operation of said starting unit and also a signal for instructing the operation of the driving device in accordance with the selected search position; and a driving device-actuating unit for moving the driving device in the prescribed direction upon receipt of the driving direction-deciding signal and drive-instructing signal both delivered from said search position-locating unit and stopping the driving device when the locating mechanism is brought to the selected search position.

6 Claims, 6 Drawing Figures

LOCATING APPARATUS

This invention relates to a locating apparatus. Hitherto, the process of finding, for example, a desired data film from a magazine in which a large number of data films are stored has been manually undertaken. Automation of said process has not been generally accepted because a complicated mechanism is required.

It is accordingly the object of this invention to provide a locating apparatus of simple arrangement. According to an aspect of the invention, there is provided a locating apparatus which comprises a search position-selecting device; a selected search position-locating device for finding a search position selected by said search position-selecting device and generating a signal for deciding the direction in which a locating mechanism-driving device is moved and also a signal for controlling the movement of the driving device in accordance with the selected search position; a driving device for moving the locating mechanism-driving device in the prescribed direction upon receipt of a driving direction-deciding signal and a drive-control signal from the selected search position-locating device.

This invention can be more fully understood from the following detailed description when taken in conjunction with the accompanying drawings, in which:

FIG. 1 is a circuit diagram of a locating apparatus according to an embodiment of this invention;

FIG. 2A sets forth the circuit arrangement of a locating apparatus according to another embodiment of the invention which can find at first a designated group of locations and then a particular selected location included in said group;

Figure 1:
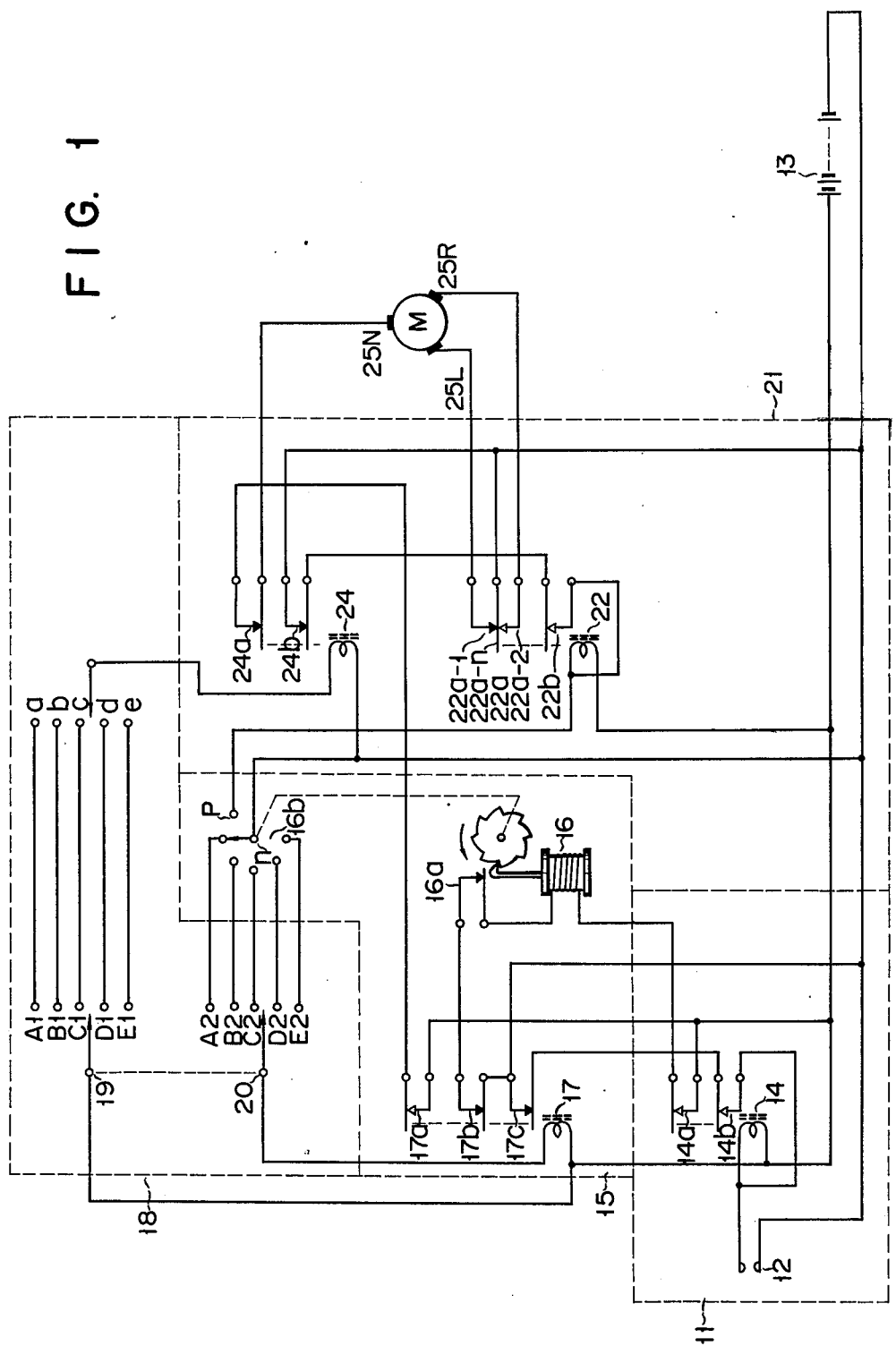

Referring to FIG. 1, a starting unit 11 includes a start switch 12 and an electromagnetic relay 14 connected to a power source 13 through the start switch 12. One terminal of the electromagnetic solenoid 16 of a selected position-locating unit 15 is connected to one pole of the power source 13 through the normally open contact 14a of the electromagnetic relay 14 and the other terminal of said solenoid 16 is connected to the other pole of said power source 13 through its own normally closed contact 16a and the normally closed contact 17b of an electromagnetic relay 17. The other normally closed contact 17c of the electromagnetic relay 17 is connected to the junction of the start switch 11 and electromagnetic relay 14 through the normally open contact 14b of the electromagnetic relay 14. A search position selecting unit 18 includes two interlockingly operated multicontact locating switches 19, 20. A plurality of contacts constituting the switch 19 are connected to the corresponding contacts of a locating mechanism. A plurality of contacts forming the switch 20 are connected to the corresponding contacts of a changeover switch 16b jointly operated with the electromagnetic solenoid 16. The neutral contact n of the changeover switch 16b is connected to said other pole of the power source 13. The contact P is connected to said one pole of the power source 13 through an electromagnetic relay 22 included in a drive control unit 21 for controlling the movement of a locating mechanism-driving device, for example, motor M. The drive control unit 21 includes a further electromagnetic relay 24. The terminal of the electromagnetic relay 22 connected to the contact P of the changeover switch 16b is connected to said other pole of the power source 13 through its own normally open contact 22b and the normally closed contact 24b of the electromagnetic relay 24. The normally closed contact 22a-1 of the changeover contact 22a of the electromagnetic relay 22 is connected to a normal rotation terminal 25L of the driving motor M the neutral terminal 25N of which is connected to the power source 13 through the contacts 24a and 17a. The normally open contact 22a-2 of said changeover contact 22a is connected to the reverse rotation terminal 25R of the motor M, and the neutral contact 22a-n of said changeover switch 22a is connected to said other pole of the power source 13.

There will now be described the operation of a locating apparatus arranged as described above where the multicontact locating switches 19, 20 are set at the selected contacts D1, D2, respectively and the start switch 11 is closed, then the electromagnetic relay 14 is actuated, and remains excited by current passing through the contacts 14b, 17c.

Operation of the electromagnetic relay 14 causes the electromagnetic solenoid 16 to be energized by current flowing through the contacts 14a, 16a, 17b. Upon energization of the electromagnetic solenoid 16, a ratchet is rotated by one cog and the interlocking changeover switch is advanced to the same extent. At this time, the changeover switch 16b is opened to deenergize the electromagnetic solenoid 16. Deenergization of said solenoid 16 again closes the changeover switch 16b to energize said solenoid 16, advancing the changeover switch 16b to an extent corresponding to the one cog rotation of the ratchet. Where the changeover switch 16b is advanced stepwise and brought to the selected contact D2, then the electromagnetic relay 17 is energized to open the contacts 17b, 17c and deenergize the electromagnetic solenoid 16 and electromagnetic relay 14. Since, at this time, the contact 17a is closed, a motor circuit is constituted by the contacts 17a and 24a, the terminals 25N and 25L, and the contact 22a-1, thereby to effect the normal rotation of the motor M.

The motor M is rotated until the locating mechanism is brought to a selected locating point. Where the locating mechanism reaches the selected locating point, a contact d corresponding to said locating point is closed to energize the electromagnetic relay 24. As the result, the circuit of the motor M is opened to stop the operation of the subject locating apparatus.

The foregoing description refers to the case where the motor is normally rotated. Now let it be assumed that the changeover switch 16b is brought to the contact D2. Where, under this condition, the locating unit 18 is set at the selected contacts A1, A2 and the start switch 12 is closed, then the changeover switch 16b is advanced to an extent corresponding to the one cog rotation of the ratchet through the above-mentioned process. When the changeover switch 16b reaches the contact P, the electromagnetic relay 22 is energized by current passing through the contact P. As a result, the motor M is brought to a state ready for reverse rotation. Namely, where the changeover switch 16b is connected to the contact P, then the moving direction of the locating mechanism-driving device is changed, attaining a quick locating operation.

There will now be described the embodiment of this invention where a desired search position or information unit is selected from among a large number of information units. Since checking of numerous information units one after another consumes considerable time, it is advised first to divide the numerous information units into a plurality of groups, and then search through a selected group to locate a desired information unit. Obviously, this process considerably shortens the locating time. The embodiment of FIG. 2 is based on the above-mentioned process.

Figure 2A:
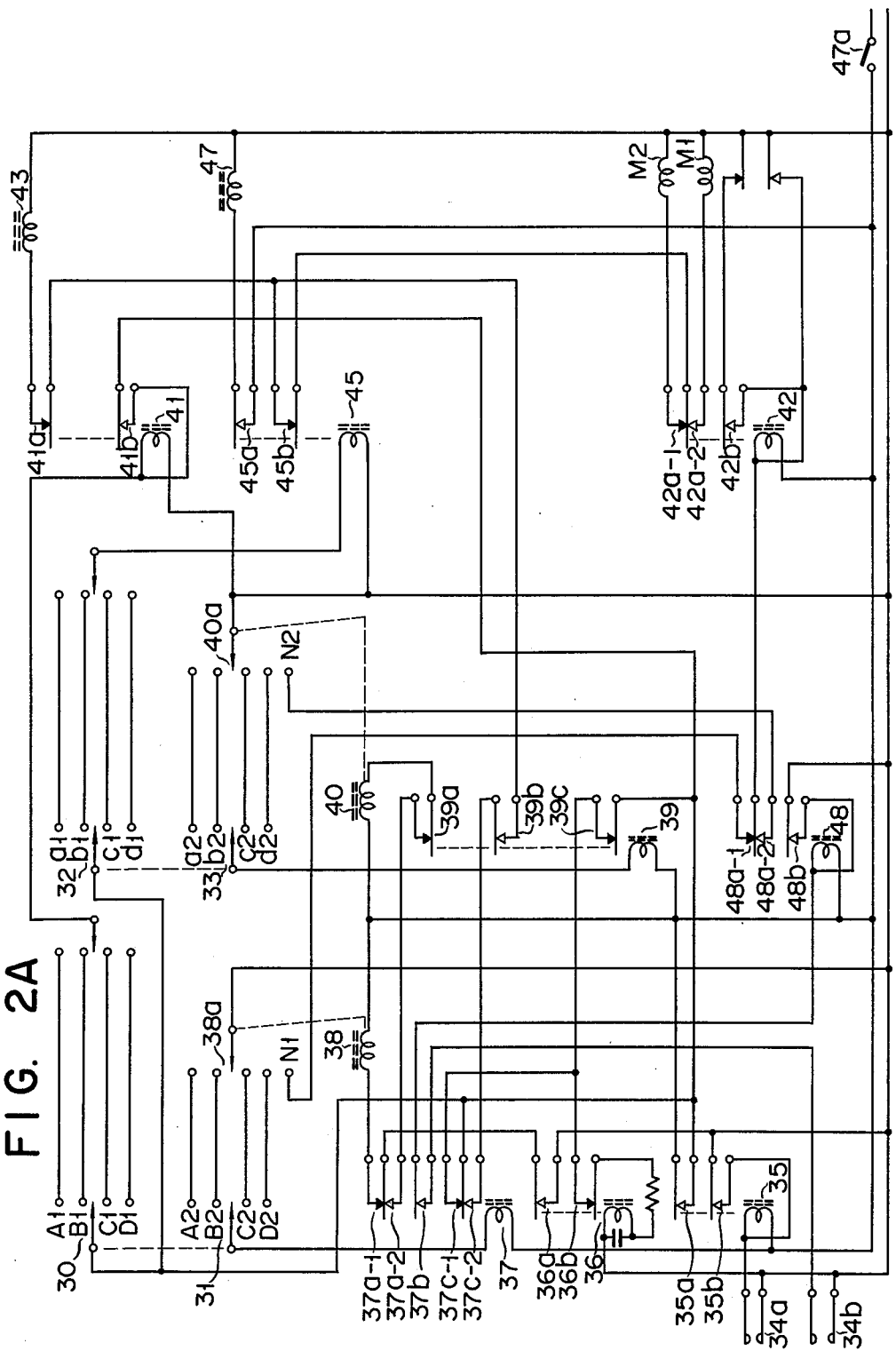
FIG. 2B is an oblique view of a clutch mechanism.
Figure 2B:
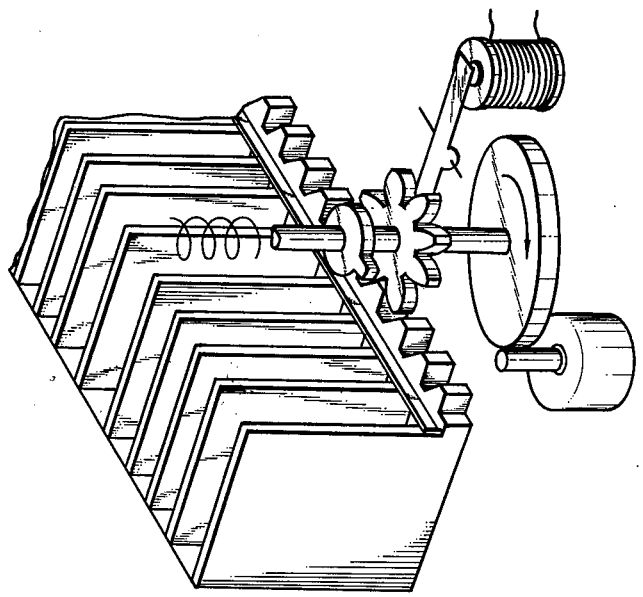

Now let it be assumed that in FIG. 2A, the locating switches 30, 31 are set at the selected contacts D1, D2 and the locating switches 32, 33 are operated through contacts d1, d2. Where under this condition, the start switch 34a is closed, then the electromagnetic relay 35 is energized, causing the electromagnetic relay 36 to be actuated by current passing through the contacts 36b, 37c-1, 35a. As the result, an electromagnetic solenoid 38 is energized by current flowing through the contact 36a of the electromagnetic relay 36 and the contact 37a-1 of the electromagnetic relay 37, causing a changeover switch 38a to be advanced to an extent corresponding to the one cog rotation of the ratchet. Since the electromagnetic relay 36 is intermittently energized, the electromagnetic solenoid 38 is also intermittently actuated in response to the operation of said relay 36, causing the changeover switch 38a to be stepwise advanced. When the changeover switch 38a is brought to the selected contact D2, then the electromagnetic relay 37 is energized. As the result, the electromagnetic solenoid 38 is deenergized, and the electromagnetic relay 36 is intermittently actuated by current conducted through the contacts 36b, 39c, 35a, causing an electromagnetic solenoid 40 to be also energized by current flowing through the contacts 35a, 36a, 37a, 39a. Said electromagnetic solenoid 40 is intermittently energized to advance a changeover switch 40a stepwise. When the changeover switch 40a reaches the selected contact d2 an electromagnetic relay 39 is energized to open the circuits of the electromagnetic solenoids 40, 36. At this time, current passage is formed through the contacts 35a, 37c-2, 39b, 45b, 42a-2 to drive a motor M1 for moving a locating mechanism. At this time, an electromagnetic solenoid 43 is also actuated to drive a clutch mechanism shown in FIG. 2B, thereby increasing the moving speed of the locating mechanism. When the locating mechanism reaches a group of information units corresponding to the selected contact D2, then the electromagnetic relay 41 is operated to open the circuits of the electromagnetic solenoid 43. As a result, the locating mechanism is slowly advanced in order to select a desired information unit from among the aforesaid group corresponding to the selected contact D2. When a desired information unit is found, the electromagnetic relay 45 is operated to open the circuits of the motor M1. At this time an electromagnetic solenoid 47 is actuated to pick up the selected information unit or carry out a similar action and open its switch 47a to open the power source circuit.

Where the changeover switch 38a passes the contact N1 to be connected to a selected contact, for example, a contact A2, then a closed circuit is formed for the electromagnetic relay 42 through said contact N1 and contact 48a-1, rendering the subject locating apparatus ready for the drive of the motor M2 which reverses the moving direction of the locating mechanism. When the start switches 34a and 34b are closed in such state that the desired information group is already selected, an electromagnetic relay 48 is energized, whereby the contact N2 controls the operation of the electromagnetic relay 42. The foregoing embodiment attains a quick search through a considerable amount of data.

Figure 3:
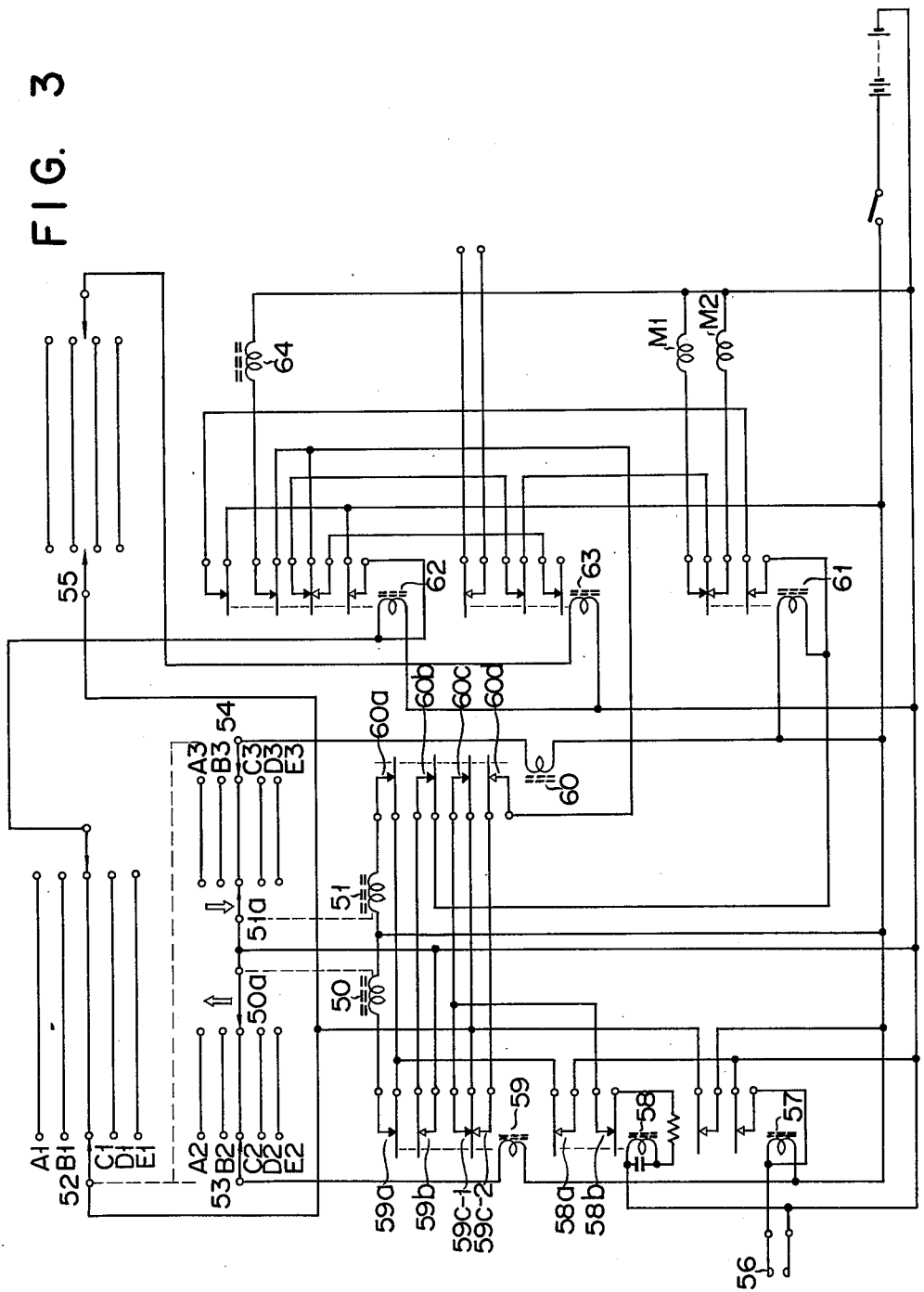
FIG. 3 is a circuit diagram of a locating apparatus according to still another embodiment of the invention based on FIG. 2.

According to another embodiment of FIG. 3, electromagnetic solenoids 50, 51 are designed to move changeover switches 50a, 51a in opposite directions at the same speed. Where, in the locating apparatus of the above-mentioned arrangement, the changeover switches 52, 53, 54, 55 are set at the selected contacts E1, E2, E3, a1, respectively and a start switch 56 is closed, then electromagnetic relays 57, 58 are energized in turn. As the result, the electromagnetic solenoids 50, 51 are intermittently actuated to move the changeover switches 50a, 51a in opposite directions at the same speed. When the changeover switch 51a is connected to the selected contact E3, an electromagnetic relay 60 is energized. As the result, the electromagnetic solenoid 51 is deenergized to stop the advance of the changeover switch 51a. Later, when the changeover switch 50a is brought to the contact E2, an electromagnetic relay 59 is energized. Since, under this condition, the circuit of the electromagnetic relay 61 is opened, the locating apparatus is rendered ready for the drive of the motor M1. Conversely where the changeover switch 50a reaches the selected contact E2, then an electromagnetic relay 61 is energized by current running through the contact 59b closed by energization of the electromagnetic relay 59 and the contact 60b of the electromagnetic relay 60. When the changeover switch 51a is brought to the contact E3 and the electromagnetic relay 60 opens the contact 60b, then an electromagnetic relay 61 is self excited, rendering the locating apparatus ready for the drive of the motor M2. An electromagnetic relay 62 is energized when search is made through a selected group of information units corresponding to the contact E2 to open the circuits of the electromagnetic relay 61 and motor M1 and M2. An electromagnetic relay 63 is actuated when a desired information unit is found in a selected group of information units. An electromagnetic solenoid 64 is used to operate a rapid feed clutch.

Figure 4:
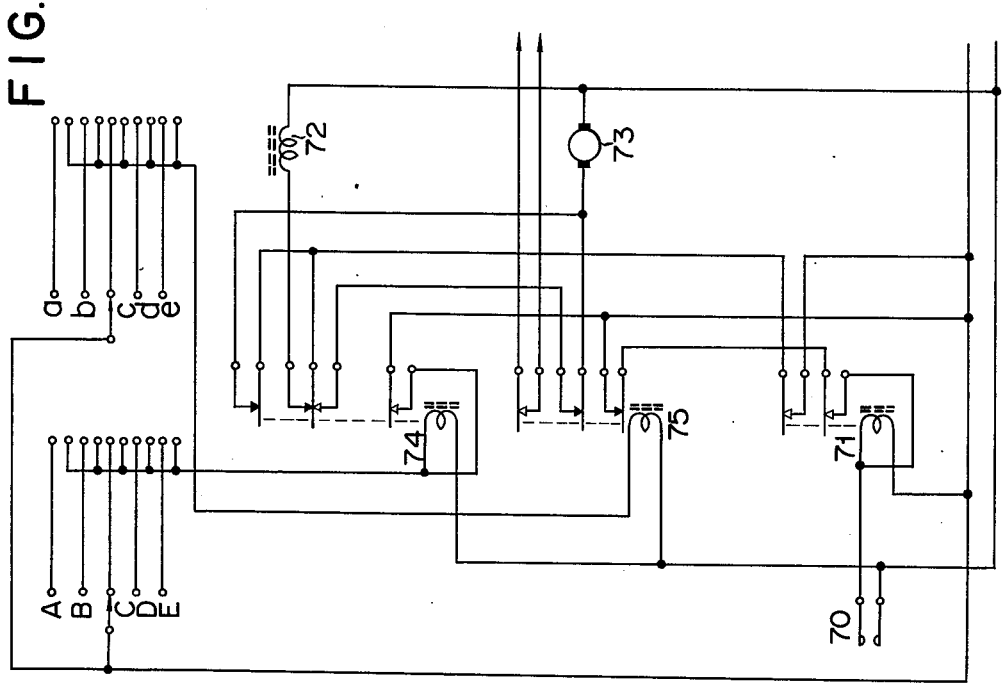
FIG. 4 is a circuit diagram of a locating apparatus according to a further embodiment of the invention based on FIG. 2 which carries out a locating operation only in one direction.

The embodiment of FIG. 4 is designed to move a locating mechanism only in one direction. Where, in this embodiment, a start switch 70 is closed, then an electromagnetic relay 71 is actuated, causing an electromagnetic solenoid 72 for the rapid feed clutch and motor 73 to be operated. Where search is made through a selected group of information units by feeding said units rapidly, then an electromagnetic relay 74 is operated and in consequence the electromagnetic solenoid 72 is deenergized. Later, a slow speed search is made to find a desired information unit from among said group. When the desired data unit is found, an electromagnetic relay 75 is energized to stop the motor 73.

Figure 5:
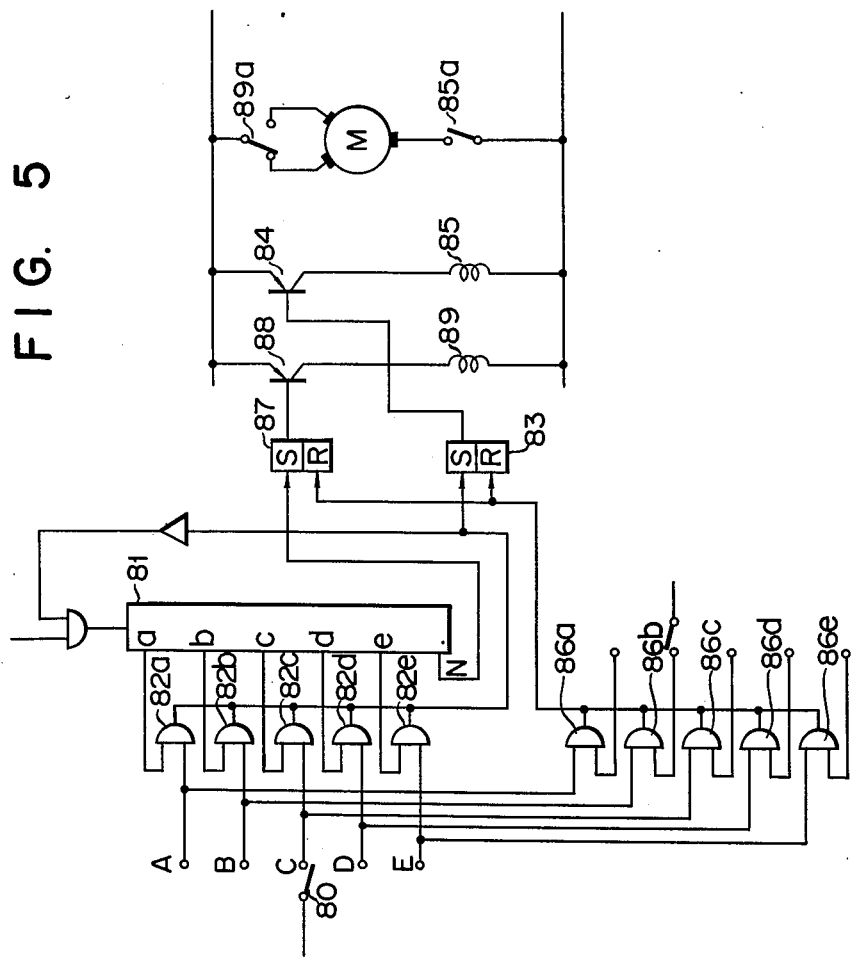
FIG. 5 is a circuit diagram of a still further embodiment of the invention, wherein the locating apparatus of FIG. 1 is formed of electronic circuits.

All the foregoing embodiments mainly are comprised of electromagnetic relays. However, it is possible to build a locating apparatus of electronic circuits as shown in the embodiment of FIG. 5. Referring to FIG. 5, a search position selecting switch 80 is set at, for example, a contact C. Clock pulses are supplied to a ring counter 81 upon operation of a start switch (not shown). When an output is obtained at the output terminal c of the ring counter 81, then an AND gate 82c generates a pulse to set a flip-flop circuit 83, an output set signal from which renders a switching transistor 84 conductive. As the result, an electromagnetic solenoid 85 is energized to drive a motor M. When a locating mechanism (not shown) driven by said motor M locates a desired information unit, then an AND gate 86c gives forth a pulse, which in turn resets the flip-flop circuit 83 to render the switching transistor 84 nonconductive and in consequence stop the motor M.

When the ring counter 81 sends forth pulses from the output terminal N, a flip-flop circuit 87 is set. Output set pulses from said flip-flop circuit 87 render a switching transistor 88 conductive. Accordingly, an electromagnetic solenoid 89 is energized to cause a switch 89a to be operated through a contact provided on the reverse rotation side of the motor M. Later when an AND gate 82c, for example, corresponding to the selected search position is opened, then the contact 85a of an electromagnetic solenoid 85 is closed for the reverse rotation of the motor M.

A locating apparatus constructed with electronic circuits increases a locating operation and can be made compact with a simple arrangement.

What is claimed is:

1. A locating apparatus coupled to a movable mechanism moving among a plurality of positions to locate a desired one of the positions, the apparatus comprising:
    at least one driving device for driving the movable mechanism;
    a search position selecting device for selectively setting a desired one of the positions, the device having a plurality of contacts corresponding to the positions;
    a start switch for starting the locating apparatus; and
    a control circuit device for controlling the driving device in response to the operation of the start switch, the control circuit comprising a first means for searching the search position selecting device for one of the contacts which corresponds to said desired position, thereby to generate a drive signal upon finding said corresponding contact and further for generating operatively a specific signal, a second means for changing the polarity of the driving device in response to said specific signal from the first means, thereby to change the moving direction of said movable mechanism, and a third means for forming a circuit for the driving device in response to the drive signal from the first means.

2. A locating apparatus according to claim 1 wherein the first means for searching the search position selecting device comprises an electromagnetic device intermittently operated in response to the operation of the start switch; a multicontact changeover switch having a plurality of first contacts connected to the search position selecting device and a second contact and interlockingly actuated with the intermittent operation of the electromagnetic device, the second means comprises a polarity changing-over relay unit actuated in response to the closing of the second contact to changeover the polarity of the driving device; and the third means comprises a relay unit actuated in response to that one of the first contacts which corresponds to the set position set by the search position setting unit to connect the driving device to a power source.

3. A locating apparatus according to claim 1 wherein the search position selecting device comprises a search position group selecting unit for selectively setting a desired search position group from among a plurality of search position groups each having a plurality of search positions and a search position selecting unit for selectively setting a desired search position from among a plurality of search positions.

4. A locating apparatus according to claim 1 wherein a step electromagnetic relay unit is provided to open the circuit for the driving device when the movable mechanism is brought to the set position.

5. A locating apparatus according to claim 1 wherein the first means comprises a ring counter having a plurality of first output terminals for generating output signals one after another and a second output terminal from which the specific signal is obtained; a plurality of first logic gates, each of which has one of the input terminals connected to one of the first output terminals of the ring counter, the other input terminal connected to one of the contacts of the search position setting device and an output terminal from which the drive signal is obtained and that the second means comprises a first flip-flop circuit which is set by the specific signal from the second terminal and a first electromagnetic relay circuit which is operated by the set signal from the first flip-flop circuit and includes a relay switch for changing the polarity of the driving device and that the third means comprises a second flip-flop circuit which is set by the drive signal from the first logic gates and a second electromagnetic relay circuit which is operated by the set signal from the second flip-flop circuit to close the circuit of the driving device.

6. A locating apparatus coupled to a movable mechanism moving among a plurality of positions to locate a desired one of the positions, the apparatus comprising:
    two driving devices for driving the movable mechanism;
    a search position selecting device for selectively setting a desired one of the positions, the device having a plurality of contacts corresponding to the positions;
    a start switch for starting the locating apparatus; and
    a control circuit device for controlling one of the driving devices in response to the operation of the start switch, the control circuit comprising a first means for searching the search position selecting device for one of the contacts which corresponds to said desired position, thereby to generate a drive signal upon finding said corresponding contact and further for generating operatively a specific signal, a second means for bringing selectively one of the driving devices into operative condition in response to said specific signal from the first means, thereby to change the moving direction of said movable mechanism, and a third means for forming a circuit for one of the driving devices in operative condition in response to the drive signal from the first means.

* * * * *